Nov. 27, 1928.
E. J. SWEETLAND
APPARATUS FOR FILLING FRAGILE CONTAINERS
Filed July 17, 1924
1,693,261
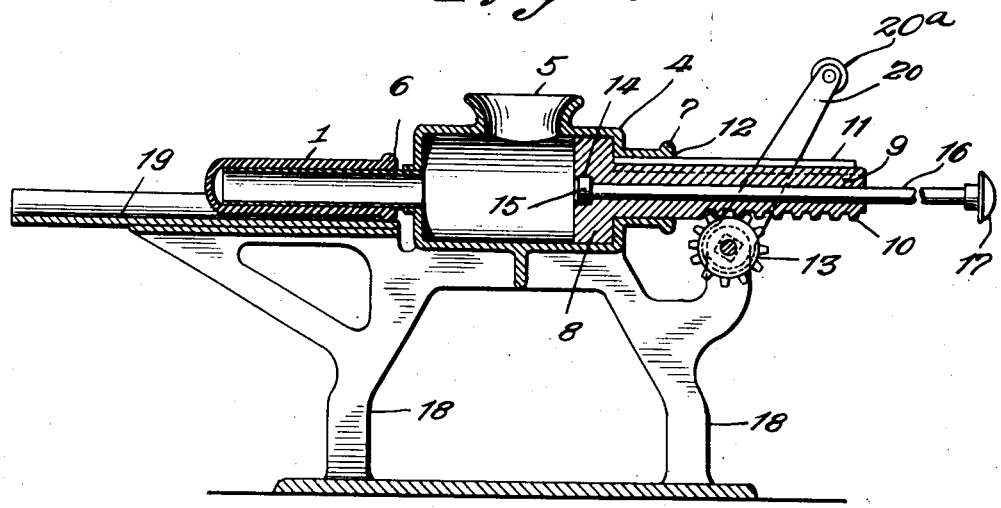
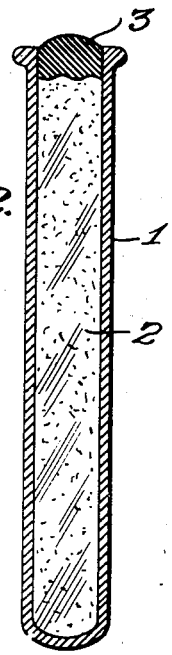
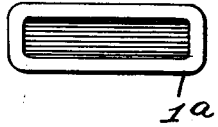
INVENTOR
ERNEST J. SWEETLAND
BY
ATTORNEY Patented Nov. 27, 1928.

1,693,261

UNITED STATES PATENT OFFICE.

ERNEST J. SWEETLAND, OF HAZELTON, PENNSYLVANIA.

APPARATUS FOR FILLING FRAGILE CONTAINERS.

Application filed July 17, 1924. Serial No. 726,499.

This invention relates to apparatus for filling fragile containers and more particularly relates to that form of apparatus which is adapted to fill a fragile container with ice cream or similar material for the purpose of providing a confection.

It is one of the objects of the invention to provide an apparatus for forming and filling a confection comprising an elongated container of cake or other edible material which is to be filled with ice cream or similar substance from end to end thereof.

Another object of the invention is to provide an apparatus whereby the ice cream or other material may be easily and quickly inserted into the containers to produce the confection described above.

A further object of the invention is to provide an apparatus for economically and efficiently filling said containers from end to end thereof.

It is a still further object of the invention to provide an apparatus for filling fragile or edible containers with a semi-solid material without destroying the container.

It is a still further object of this invention to provide an apparatus for filling fragile containers which apparatus is provided with a primary and secondary piston for filling the container from end to end thereof.

Various other objects and advantages will appear as the description of the invention proceeds.

Referring now to the drawings which illustrate the apparatus and show by way of example the confection which may be manufactured therefrom.

Figure 1 is a sectional elevation of one form of apparatus for filling the containers.

Figure 2 is a sectional view of one of the containers filled with ice cream or the like.

Figure 3 is a side view and Figure 4 is a plan view of another form of container.

The article of my invention comprises an elongated container 1 of edible material such as cake, candy, chocolate or the like, which may be of round, rectangular, hexagonal or other shape and is preferably of about the size of an ordinary test tube. This container is almost completely filled with ice cream, jello or any other foodstuff 2 which cannot be satisfactorily eaten without some form of support or container. The material is packed into the container so as to be evenly distributed from end to end thereof so that about the same proportion of the material of the container and the contents thereof is taken into the mouth at each bite whether the bite is being taken from near the top or near the bottom of the container. If desired the top of the container may be sealed at 3 with chocolate or any other suitable material.

In order to fill an elongated container of small diameter with ice cream throughout its length, I first form the ice cream or other material into a charge or cylinder of approximately the diameter and shape of the container and then fill the container from the bottom to the top thereof with said charge.

One form of apparatus for expeditiously carrying out this process is shown in Figure 1 of the drawings. This comprises a cylindrical casing 4 provided with a filling hopper 5 and having in the center thereof, at one end an extrusion and forming nozzle 6 and at the other end a cylindrical guide 7. A piston 8 inside the casing 4 is provided on the back thereof with a projection 9, the underside of which is shaped to form a rack 10, and a key 11 in the projection and a keyway 12 in the guide 7 insure registry of the rack 10 with the pinion 13. A crank 20, with a handle 20ª is provided for turning the pinion 13.

In the center of the piston 8, a recess 14 is provided and in this recess a secondary piston 15 of rubber or other flexible material adapted to make a tight fit with the nozzle 6 normally rests. A plunger 16 slidable thru an opening in the projection 9 is connected to the piston 15 and beyond the projection 9 is provided with a knob or handle 17 whereby the plunger may be moved independently of the piston 8 and projection 9.

A suitable supporting frame 18 supports the casing 4 and rack 10 with the pinion 13 in operative position thereto, and also supports a detachable tray 19 upon which the containers 1 are supported in filling position.

In the operation of the machine, a portion of ice cream is placed in the casing 4 thru the hopper 5, and the tubular cake element 1 is slipped over the tubular nozzle 6 as shown in the drawings. The handle 20ª is now advanced in a forward direction causing the piston 8 to force the ice cream into the forming nozzle 6. When the handle 20 has been advanced as far as it will go all of the ice cream has been forced out of the casing 4 into the nozzle 6. The secondary plunger 16 is now pressed forward by hand in such manner that the ice cream in the nozzle 6 is forced out of the nozzle by the piston 15 into the cake container 1, filling it full of ice cream from bottom to top. For convenience the tray 19 is provided to sustain the weight of the confection until it is taken off by the operator.

It will be noted that the apparatus thus provided is substantially self-cleaning and is admirably adapted for filling the containers at occasional intervals for retail trade, as there is no loss of the ice cream and no cream left in the machine to necessitate washing out and cleaning before the next batch of containers is filled.

It will be obvious, of course, that by lengthening the nozzle 6 or increasing the amount of ice cream charged into the casing 4, the apparatus could be used for filling two or more containers with one charging.

Figures 3 and 4 illustrate a rectangular shaped container 1ª and various other shapes may be used within the spirit of the invention. It is usually desirable to shape the nozzle 6 like the container to be filled.

Where it is desired to keep the confection for any considerable length of time, after the container has been filled, the cake containers may be lined with butter, gelatine, cocoa butter, chocolate or other edible material which will resist moisture for a suitable length of time.

The principles of my invention are not limited to the specific embodiments described herein as obviously, a larger machine operated by hydraulic or other power and employing the process disclosed could be used where it is necessary to fill a large number of containers in rapid succession or the one casing 4 could be provided with a plurality of separate extension nozzles 6 with separate pistons and plungers 15 and 16 where more rapid filling than that given by the single nozzle 6 is desired.

All these and various other modifications and changes may be made within the spirit of the invention and scope of the appended claims.

I claim:

1. In an apparatus for filling edible containers of the type described, a casing having a charging opening therefor, an elongated nozzle a piston for forcing substantially solid ice cream in said casing into the nozzle, means to operate said piston, a secondary piston adapted to enter said nozzle and force the material therefrom, means whereby said secondary piston may be manually operated and means to support an elongated container in position to receive the material as it is forced from said nozzle, and to permit said container to move longitudinally on said nozzle as it is filled by said material.

2. In an apparatus for filling edible containers of the type described, a casing having a charging opening therefor, an elongated nozzle attached thereto, a piston substantially the size of the casing for forcing a semi-solid ice cream in said casing into the nozzle, the piston closing the charging opening as it moves to displacement position, means to operate the piston, a secondary piston adapted to enter said nozzle and force the material therefrom, said secondary piston being encompassed by the first piston and acting in tandem therewith, means to operate the secondary piston, and means to support an elongated container in position to receive the material as it is forced into said nozzle by said first piston, and subsequently removed therefrom by said secondary piston and to permit said container to move longitudinally on said nozzle as it is filled with said material.

3. In an apparatus for filling containers of the type described with a semi-solid material, a casing having a charging opening therefor, an elongated nozzle attached thereto, a piston substantially the size of the casing for forcing the semi-solid material in said casing into the nozzle, means to operate said piston, a secondary piston adapted to enter said nozzle and force the material therefrom, means whereby said secondary piston may be operated, and means to support an elongated container in position to receive the material as it is forced from said nozzle and to permit said container to move longitudinally on said nozzle as it is filled by said material.

4. An apparatus for filling fragile containers with a substantially solid material, comprising a cylindrical casing having a charging opening therein, an elongated nozzle attached thereto, a piston substantially the size of said casing for forcing the material into said nozzle, the piston sealing the casing in its displacing movement, means to operate said piston, a secondary piston centrally located in said first piston and an operating means for said secondary piston extending externally of the operating means for the first piston, said second piston being adapted to enter the nozzle to displace the material therein, the nozzle compacting and directing said material to completely fill the container without rupture.

In testimony whereof I have affixed my signature to this specification.

ERNEST J. SWEETLAND.